July 28, 1931.  A. D. ILIOVICI  1,816,778
ELECTRIC MEASURING AND PROTECTING DEVICE
Filed Dec. 21, 1927  4 Sheets-Sheet 1

Inventor
Avram D. Iliovici
by Wilkinson & Fisher
Attorneys.

July 28, 1931.   A. D. ILIOVICI   1,816,778
ELECTRIC MEASURING AND PROTECTING DEVICE
Filed Dec. 21, 1927   4 Sheets-Sheet 2

Inventor
Avram D. Iliovici
by Wilkinson & Giusta
Attorneys.

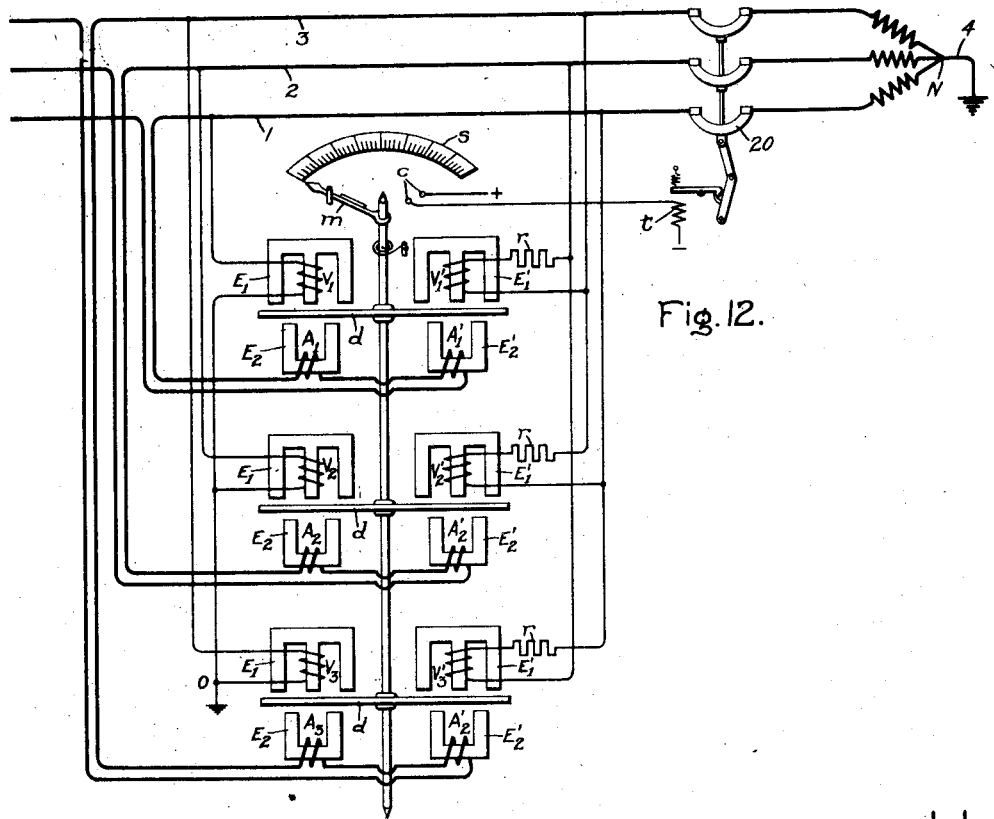
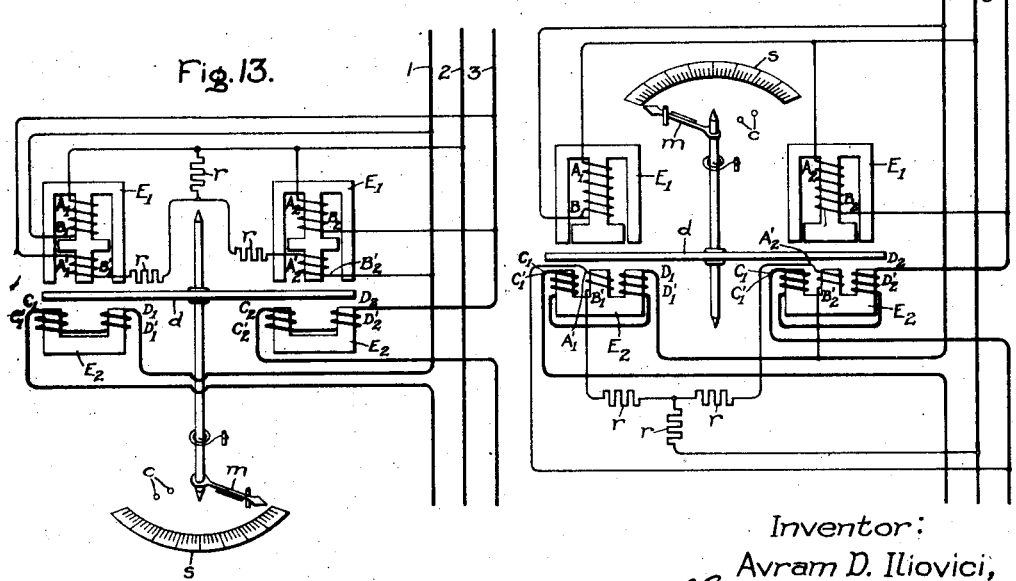
Inventor:
Avram D. Iliovici,
by Charles E. Tullar
His Attorney.

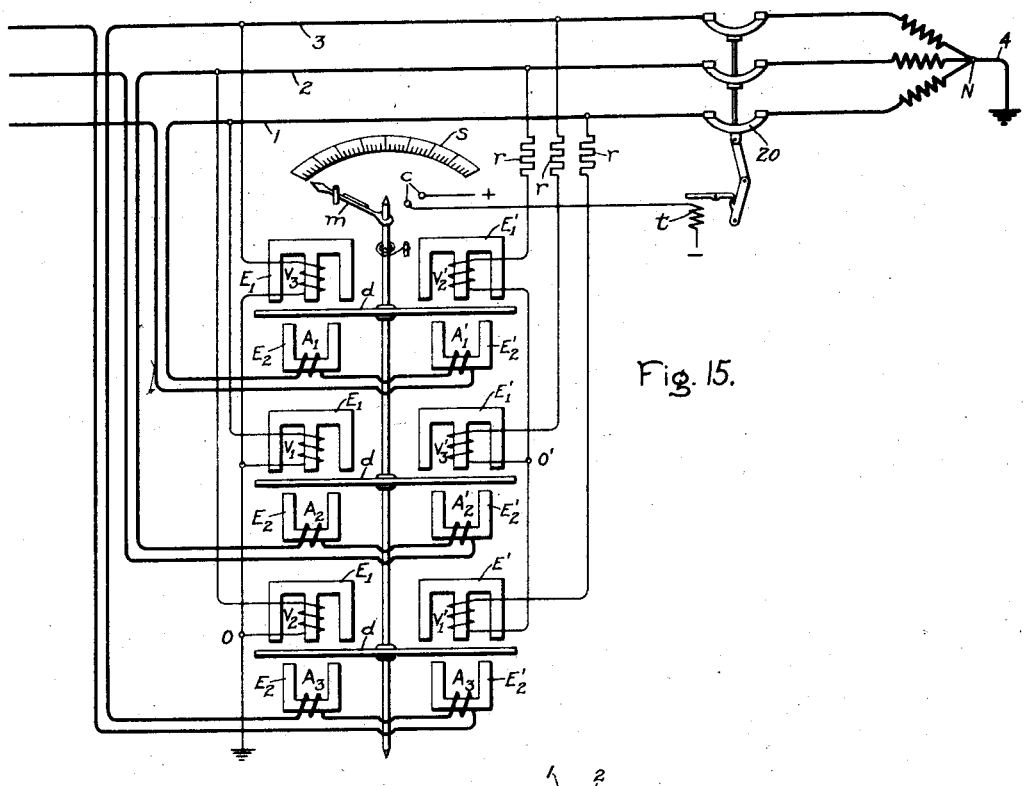

Patented July 28, 1931

1,816,778

UNITED STATES PATENT OFFICE

AVRAM DAVID ILIOVICI, OF PARIS, FRANCE, ASSIGNOR, BY MESNE ASSIGNMENTS, TO GENERAL ELECTRIC COMPANY, A CORPORATION OF NEW YORK

ELECTRIC MEASURING AND PROTECTING DEVICE

Application filed December 21, 1927, Serial No. 241,622, and in France January 7, 1927.

The present invention relates to electric circuit protecting or measuring instruments which are subjected to torques which are functions of any one or more of the phase sequence components of the power or other electric quantity involved.

One object of the present invention is to provide circuit arrangements and apparatus for producing two torques which are functions of any one or more of the phase sequence components of the power in the circuit which is to be protected or which is under measurement, whereby the sum of or the difference between said torques is made to act on a movable element in such a manner that the relative value or values of one or more of the phase sequence components in the function representing the resultant torque shall be diminished.

A further object of the present invention is to adjust the aforementioned torques in such wise that either one or two of the phase sequence components of the power shall vanish completely from the function representing their resultant.

There are a number of ways of designing apparatus for polyphase circuits wherein the torque acting on the movable element depends on the useful power or the wattless power, or, speaking generally, on an intermediate component which we shall call the complex power, $P\alpha$ of the circuit.

By complex power of angle $\alpha$ is understood the quantity $P\alpha$ having the form $$P\alpha = EI \cos(\alpha \pm \phi) \ldots (1),$$

in the case of a two-wire single phase circuit, the currents and voltages being of sinusoidal wave-form, (I and E are the root-mean-square or effective values of the current and voltage, $\phi$ the phase angle between these quantities and $\alpha$ an angle which represents the angular departure in a given direction from the in-phase relationship of current and voltage at which the apparatus has maximum torque and which may be positive or negative, for example, in a wattmeter $\alpha = 0°$ and in a reactive kva. meter $\alpha = \pm 90°$). In polyphase circuits, the expression $P\alpha$ is deduced from the formula (1) in the same way as the useful power or the wattless power is deduced from the formulæ

$$P_u = EI \cos \phi \ldots (1')$$

and $$P_w = EI \sin \phi \ldots (1''),$$

respectively which are particular cases of formula (1).

In certain circuit arrangements, the relation between the torque and power holds true to whatever extent the currents and voltages are unbalanced; in others, the relation holds only when the currents or the voltages, or both together, are balanced.

Both in three-phase and two-phase systems, the formula $$P\alpha = A(P\alpha_d + P\alpha_i + P\alpha_o) \ldots (2)$$

is true, denoting any complex power (in particular a useful power or a wattless power) by $P\alpha$ and the positive, negative and zero phase sequence components of this power by $P\alpha_d$, $P\alpha_i$ and $P\alpha_o$; and A, a coefficient. $A=3$ for three-phase systems and $A=2$ for two-phase systems. Often $P\alpha_o = 0$ that is when there is no leakage current or the apparatus does not respond to the zero phase sequence component of the power, for example, in the two wattmeter connection for measuring power.

If therefore the torque of the apparatus is a function of the power, irrespective of the degree of unbalance of the currents or voltages:

$$C = f(P\alpha_d + P\alpha_i + P\alpha_o) \ldots (3)$$

in practice $$C = k(P\alpha_d + P\alpha_i + P\alpha_o) \ldots (3')$$

where $k$ is practically a constant. For the sake of simplicity this case only will be considered, but it should be understood that the invention applies to the most general case.

If the instantaneous values of the voltages to ground of the conductors of a three-phase circuit are $e_1$, $e_2$, $e_3$ and the currents in the corresponding conductors $i_1$, $i_2$, $i_3$ then, as is known, these may be expressed in terms of their positive, negative and zero phase sequence components, distinguished by the sub-letters $d$, $i$ and $o$ respectively, as follows:

$$e_1 = e_{1_d} + e_{1_i} + e_{1_o}$$
$$e_2 = e_{2_d} + e_{2_i} + e_{2_o}$$
$$e_3 = e_{3_d} + e_{3_i} + e_{3_o}$$
$$i_1 = i_{1_d} + i_{1_i} + i_{1_o}$$
$$i_2 = i_{2_d} + i_{2_i} + i_{2_o}$$
$$i_3 = i_{3_d} + i_{3_i} + i_{3_o}$$

The expression for the total instantaneous energy, $p$, is then:

$$P = e_1 i_1 + e_2 i_2 + e_3 i_3 = e_{1_d} i_{1_d} + e_{2_d} i_{2_d} + e_{3_d} i_{3_d}$$
$$+ e_{1_i} i_{1_i} + e_{2_i} i_{2_i} + e_{3_i} i_{3_i}$$
$$+ e_{1_o} i_{1_o} + e_{2_o} i_{2_o} + e_{3_o} i_{3_o}$$
$$+ e_{1_d} i_{1_i} + e_{2_d} i_{2_i} + e_{3_d} i_{3_i}$$
$$+ e_{1_i} i_{1_d} + e_{2_i} i_{2_d} + e_{3_i} i_{3_d}$$
$$+ e_{1_d} i_{1_o} + e_{2_d} i_{2_o} + e_{3_d} i_{3_o}$$
$$+ e_{1_o} i_{1_d} + e_{2_o} i_{2_d} + e_{3_o} i_{3_d}$$
$$+ e_{1_o} i_{1_i} + e_{2_o} i_{2_i} + e_{3_o} i_{3_i}$$
$$+ e_{1_i} i_{1_o} + e_{2_i} i_{2_o} + e_{3_i} i_{3_o}$$

By taking the root-mean-square or effective values we have for the total power, $P$:

$$P = E_1 I_1 \cos \phi_1 + E_2 I_2 \cos \phi_2 + E_3 I_3 \cos \phi_3$$

or $$P = E_{1_d} I_{1_d} \cos \phi_{1_d} + E_{2_d} I_{2_d} \cos \phi_{2_d} + E_{3_d} I_{3_d} \cos \phi_{3_d}$$
$$+ E_{1_i} I_{1_i} \cos \phi_{1_i} + E_{2_i} I_{2_i} \cos \phi_{2_i} + E_{3_i} I_{3_i} \cos \phi_{3_i}$$
$$+ E_{1_o} I_{1_o} \cos \phi_{1_o} + E_{2_o} I_{2_o} \cos \phi_{2_o} + E_{3_o} I_{3_o} \cos \phi_{3_o};$$

that is $P = P_d + P_i + P_o$  (3'')

The total energy of the circuit is the sum of the positive, negative and zero energy or the sum of the scalar products of the direct or positive phase sequence components of the voltages and currents, the products of the inverse or negative phase sequence components of the voltages and currents and the products of the zero phase sequence components of the voltages and currents. The average value of the other terms is zero and constitutes what is called a fluctuating energy which is a double frequency pulsation.

All the methods which measure correctly the power of a three-phase circuit, therefore, measure the sum of the positive, negative and zero phase sequence power components, for example P or a torque dependent thereon can be obtained by making a correct measurement of the total power of the circuit with the three wattmeter connection and the positive and negative components with the two wattmeter connection.

If the relation between torque and power, that is $C = nP\alpha$, $n$ being a constant, holds good only when at least one of the systems, voltage or current, is balanced, this torque will always be a function of certain complex powers $P\alpha_d'$, $P\alpha_i''$, $P\alpha_o'''$ which may correspond to different values of angle $\alpha$, $P\alpha_d'$ being a positive phase sequence component of power, $P\alpha_i''$ being a negative phase sequence component of power and $P\alpha_o'''$ a zero phase sequence component of the power. Thus, if there is taken the sum of the vectorial products of each current by the opposite line to line voltage, that is the voltage in quadrature to the current under balanced circuit conditions, there results:

$$P' = E_{2\cdot 3} I_1 \sin \phi'_1 + E_{3\cdot 1} I_2 \sin \phi'_2 + E_{1\cdot 2} I_3 \sin \phi'_3, \quad \phi'_1, \phi'_2, \phi'_3$$

being the angles between respectively associated voltages and currents. This can be expressed:

$$P' = (E_3 - E_2) I_1 \sin \phi'_1 + (E_1 - E_3) I_2 \sin \phi'_2 + (E_2 - E_1) I_3 \sin \phi'_3$$

or using the phase sequence components of the currents and voltages as:

(9) $P' = (E_{3_d} - E_{2_d}) I_{1_d} \sin \phi'_{1_d} + (E_{1_d} - E_{2_d}) I_{2_d} \sin \phi'_{2_d}$
$+ (E_{2_d} - E_{1_d}) I_{3_d} \sin \phi'_{3_d} + (E_{1_i} - E_{2_i}) I_{1_i} \sin \phi'_{1_i}$
$+ (E_{1_i} - E_{3_i}) I_{2_i} \sin \phi'_{2_i} + (E_{2_i} - E_{1_i}) I_{3_i} \sin \phi'_{3_i}$ But according to the phase sequence component theory:

$$E_{3_d} - E_{2_d} = j\sqrt{3} E_{1_d} \qquad E_{3_i} - E_{2_i} = -j\sqrt{3} E_{1_i}$$
$$E_{1_d} - E_{3_d} = j\sqrt{3} E_{2_d} \text{ and } E_{1_i} - E_{3_i} = -j\sqrt{3} E_{2_i}$$
$$E_{2_d} - E_{1_d} = j\sqrt{3} E_{3_d} \qquad E_{2_i} - E_{1_i} = -j\sqrt{3} E_{3_i}$$

Substituting in (9), there results:

$$P' = \sqrt{3}(E_{1_d} I_{1_d} \cos \phi_{1_d} + E_{2_d} I_{2_d} \cos \phi_{2_d} + E_{3_d} I_{3_d} \cos \phi_{3_d}$$
$$- E_{1_i} I_{1_i} \cos \phi_{1_i} - E_{2_i} I_{2_i} \cos \phi_{2_i} - E_{3_i} I_{3_i} \cos \phi_{3_i})$$

or $P' = \sqrt{3}(P_d - P_i)$  (4'')

Methods and apparatus for obtaining effects in accordance with Equation (4'') are described in connection with the several figures of the drawings.

In particular, in the case corresponding to formula (3') $a$, $b$ and $c$ being constants $$C = aP\alpha'_d + bP\alpha''_i + cP\alpha'''_o \quad .. \quad (4)$$

If the sum of or the difference between two torques, one of form (3) or (3') and the other of form (4) (or of the general form corresponding thereto in the case of non proportionality) or both of form (4), be applied to the movable element, the component torques can, by a suitable choice of design characteristics, be adjusted in order to cause one of the symmetrical components to vanish from the resultant torque. Thus, if there be provided, as in accordance with my invention, apparatus responsive to a resultant of two effects, such as the sum of or the difference between the functions set forth in Equations (3'') and (4''), operation dependent on at least one phase sequence component follows since from the sum, $P + P'$, there results:

$$2P_d + P_o = P + \frac{P'}{\sqrt{3}}$$

and if $P_o = 0$ $$P_d = \tfrac{1}{2}\left(P + \frac{P'}{\sqrt{3}}\right)$$

and from the difference, $P - P'$ $$2P_i + P_o = P - \frac{P'}{\sqrt{3}}$$

and if $P_o = 0$ $$P_i = \tfrac{1}{2}\left(P - \frac{P'}{\sqrt{3}}\right)$$

Generally the positive phase sequence component will be eliminated and the torque will then depend on only the negative and zero phase sequence components. As it is easy to cause this latter to vanish, it will then be possible to influence the apparatus solely by the negative phase sequence component of the power. It is likewise possible to obtain a torque depending solely on the positive or zero phase sequence component. Moreover, matters may be arranged so that the component or components which have not been eliminated shall correspond to any desired complex power as will hereinafter appear.

The present invention relates to measuring or protecting apparatus, wattmeters, other meters, relays and the like, in which the principles set forth above are applied. The desired results will be obtained by a suitable choice of the currents and voltages acting on the windings of the apparatus, by producing suitable phase angle displacements between the currents in said windings, or between the magnetic fluxes they produce and the voltages or the currents in the phases of the circuit which is to be protected or which is under measurement.

The various phase angle displacements will be obtained by using reactance coils, capacities, short-circuited rings or circuits, transformers or any other suitable means.

My invention will be better understood from the following description when considered in connection with the accompanying drawings and its scope will be pointed out in the appended claims.

In the drawings:

Fig. 12 illustrates diagrammatically an embodiment of my invention according to the arrangements shown in Figs. 1 and 2.

Figs. 13 and 14 illustrate diagrammatically modifications, in accordance with Figs. 8 and 9 respectively, of the embodiment of my invention shown in Fig. 6.

Fig. 15 illustrates diagrammatically a modification of the embodiment of my invention shown in Fig. 12, connected in accordance with Figs. 10 and 11.

Fig. 16 illustrates diagrammatically another modification of my invention.

Figure 1:
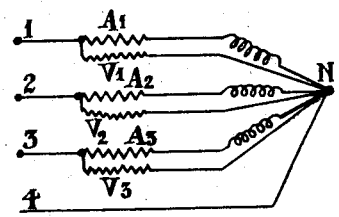
Fig. 1 illustrates diagrammatically a wattmeter connected in a four-wire three-phase system for producing a torque of the form $$k \; (P_d + P_i + P_o).$$
Figure 2:
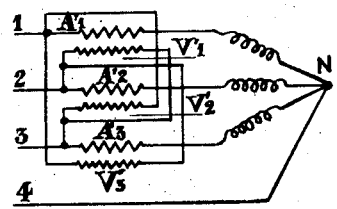
Fig. 2 illustrates diagrammatically how a wattmetric device similar to that of Fig. 1 is connected to produce a torque of the form $k \; (P_d - P_i)$.
Figure 3:
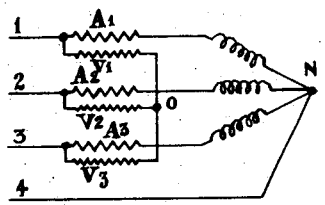
Fig. 3 illustrates a circuit arrangement similar to that of Fig. 1 except that the voltage coils are connected to an artificial or ungrounded neutral point.

In the first case, a 4-wire three-phase circuit will be considered, and it will be assumed that an induction device which is similar to a wattmeter and which comprises three electro-magnets or motoring devices including the elements $E_1$, $E_2$, as shown in Fig. 12 for a 4-wire circuit is used. The apparatus being connected according to the wiring diagram of Fig. 1, the movable element including the disks $d$ is subjected to a torque of the form (3'). In Fig. 1, 1, 2 and 3 are the three line wires and 4 the neutral wire; N is the neutral point; $A_1$, $A_2$, $A_3$, the current coils of the three electro-magnets of the apparatus; $V_1$, $V_2$, $V_3$, their voltage coils. The torque effect of each of the motoring elements $E_1$ $E_2$ will be substantially proportional to the product of the voltage and the current, energizing the respectively associated windings and the cosine of the phase angle between such voltage and current.

Three other electro-magnets or motoring devices, including the elements $E'_1$, $E'_2$, as shown in Fig. 12, of wattless power or reactive kva. measuring wattmetric devices (e. g. electro-magnets, the current coils of which are connected in similar manner to those of the preceding electro-magnets $E_1$, $E_2$, but the voltage coils of which have a negligible reactance in comparison with their resistance) are caused to act on the same movable element including the disks $d$ or on an element mechanically coupled to it. The coils of these electro-magnets $E'_1$, $E'_2$ are connected according to the wiring diagram of Fig. 2, in which 1, 2 and 3 are the line wires; 4 the neutral wire and N the neutral point; $A'_1$, $A'_2$, $A'_3$ are the current coils of the electromagnets; $V'_1$, $V'_2$, $V'_3$ their voltage coils. The torque of each of the motoring devices $E'_1$ $E'_2$ will be substantially proportional to the product of the voltage and the current, energizing the respectively associated windings, and the sine of the phase angle between such voltage and current. In order that the voltage coils may have a negligible reactance in comparison with their resistance or, in other words, that the current in the voltage coils may be in phase with the voltage, suitable phase displacing means such as resistors $r$ may be used.

In the first circuit arrangement (Fig. 1,) the torque exerted by the motoring elements $E_1$ $E_2$ (Fig. 12) and acting on the movable equipment $d$ is of the form:

$$C_1 = k(P_d + P_i + P_o) \ldots (5)$$

Where $P_d$ is the positive phase sequence component of the useful power and $P_i$ and $P_o$ the negative and zero phase sequence components thereof respectively.

With the last-mentioned circuit arrangement (namely that of Fig. 2,) the torque exerted by the motoring elements $E'_1$ $E'_2$ (Fig. 12) is:

$$C_2 = k(P_d - P_i) \ldots (6)$$

assuming that matters are so arranged that the same constant $k$ obtains for $C_1$ and $C_2$. If the two torques are made to act on the same movable element, for example the shaft supporting the disks $d$ in Fig. 12, in opposition to each other, the resultant torque will be:

$$C = C_1 - C_2 = k(2P_i + P_o) \ldots (7)$$

In this manner a device is obtained which is only subjected to the influence of the negative and zero phase sequence components of the power. Consequently, by providing the movable element with a member $m$ which may be an indicator to cooperate with a scale $s$ or which may be arranged to control contacts $c$, it is possible to effect either an indication or obtain an operation dependent upon the sum of the negative and the zero phase sequence components of the power. If the electroresponsive device according to Fig. 12 is for protective purposes, the contacts $c$ may be arranged to control the circuit of a trip coil $t$ of a circuit breaker 20 since abnormal circuit conditions such as phase unbalance, short-circuits and grounds usually result in negative phase sequence power and, in case of grounds, also zero phase sequence power. My invention is, of course, not limited to such arrangements but obviously includes the use of the rotation of the disks $d$ or their common shaft to drive a recording mechanism such as is used in watthour meters.

If the circuit arrangement of Fig. 3 in which the three voltage circuits, assumed to be identical, are connected to an artificial or isolated neutral point 0 be substituted for that of Fig. 1, that is the common point of the voltage windings $V_1$, $V_2$, $V_3$ of Fig. 12 is not grounded, then the $P_o$ term of Equation (5) disappears and $$C_1 = k(P_d + P_i) \ldots (5')$$

and the torque C assuming $C_1$ of Equation (5') and $C_2$ of Equation (6) to act in opposition on the same movable element, becomes:

$$C = 2k, P_i \ldots (7')$$

The apparatus is subjected to only the negative phase sequence component of the power.

The circuit arrangements may be simplified if the relations holding between the voltages be taken into account (e. g. that the sum of the line voltages is zero or that the sum of the phase voltages is zero as in the case of Fig. 3) or the relations holding between the currents (the sum of the currents is zero in three wire ungrounded circuits). Thus, for three wire circuits, the circuit arrangements of Figs. 3 and 2 may be replaced by the two coil arrangements of Figs. 4 and 5 respectively in which the reference letters have the same meaning as in Figs. 3 and 2; O being an artificial or isolated neutral point and $r, r, r$ three noninductive resistances.

Figure 5:
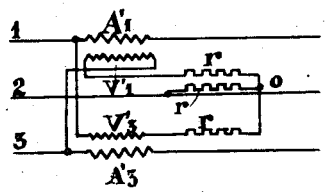
Figs. 4 and 5 illustrate circuit arrangements similar to those of Figs. 3 and 2 for a three-wire three-phase circuit.
Figure 6:
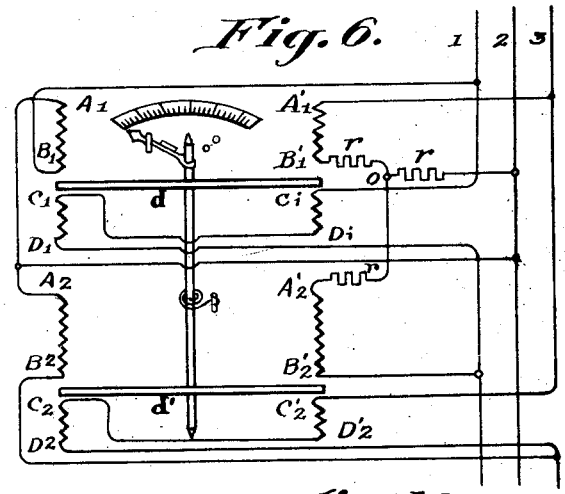
Figs. 6 and 7 show diagrammatically how the circuit arrangements of Figs. 4 and 5 can be applied to the circuit measuring or protecting apparatus.
Figure 4:
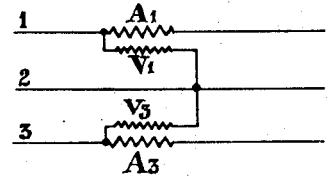
Figure 7:
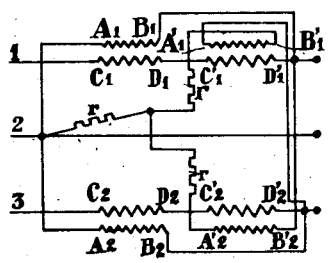

Fig. 6 is a diagrammatic view of an apparatus which can be connected as indicated in Figs. 4 and 5. The apparatus is connected in the circuit as shown in Figs. 6 and 7. In these figures, $A_1 B_1$ and $A_2 B_2$ represent the two highly inductive voltage circuits; $A'_1 B'_1$ and $A'_2 B'_2$ the two noninductive voltage circuits; $C_1 D_1$, $C_2 D_2$, $C'_1 D'_1$, $C'_2 D'_2$ the current circuits; $d$ and $d'$ two metallic disks.

Figure 9:
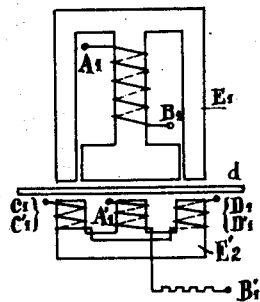
Figs. 8 and 9 show diagrammatically circuit arrangements for the electro-magnets acting on the rotating element.
Figure 8:
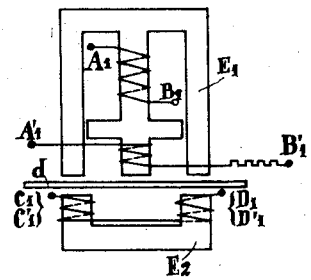

The two voltage coils $A_1 B_1$ and $A'_1 B'_1$ may be placed on one and the same electro-magnet which will include only a single current coil; the like applies to $A_2 B_2$ and $A'_2 B'_2$. Figs. 8 and 9 show two wiring diagrams for such electro-magnets. In these figures, $E_1$ and $E_2$ represent the two magnetic circuits; and the other letters refer to the same parts as in Figs. 6 and 7. The two electro-magnets of the apparatus may act on the same disk $d$ as shown in Figs. 13 and 14. This simplifies the construction.

Figure 10:
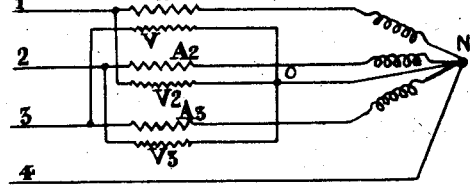
Figs. 10 and 11 show two other circuit arrangements.
Figure 11:
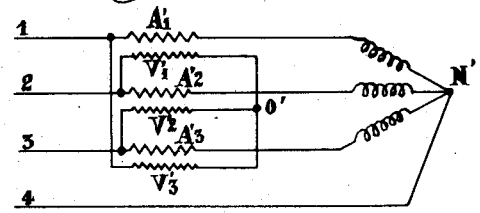

Figs. 10 and 11 illustrate two other circuit arrangements using three electro-magnets. In Fig. 10, $A_1$, $A_2$, $A_3$ represent the three current circuits and $V_1$, $V_2$, $V_3$ the three voltage circuits of the electro-magnets.

1, 2, and 3 are the three line wires, 4 the neutral wire, N the neutral point, O the point common to the three circuits $V_1$, $V_2$, $V_3$.

In Fig. 11, $A'_1$, $A'_2$, $A'_3$ are the current circuits and $V'_1$, $V'_2$, $V'_3$ the voltage circuits of the electro-magnets.

The arrangements shown in Figs. 10 and 11 may be carried out constructionally as shown diagrammatically in Fig. 15 after the manner described for Figs. 1 and 2 as shown in Fig. 12. In Fig. 1, the current $I_1$ is associated with the voltage $E_1$, but in Fig. 10, it is voltage $E_3$, which leads $E_1$ 120° and in Fig. 2 with current $I_1$ there is associated voltage $E_{2.3}$ but in Fig. 11 it is voltage $E_2$ which lags $E_{2.3}$ 30°. In Fig. 15, as well as those previously discussed, insulating transformers such as those of the potential and current type have been omitted for the sake of simplicity but it is understood that these will be provided where necessary or desirable.

If matters are arranged so that, for balanced noninductive circuits, the fluxes in the current circuits shall be out of phase with respect to those of the voltage circuits of the electro-magnets by $(\alpha - 120°)$ in the circuit arrangement of Fig. 10, and by $(\alpha + 120°)$ in the circuit arrangement of Fig. 11, that is the fluxes derived from $E_1$ are out of phase with the fluxes derived from $I_1$ by $(\alpha - 120°)$ and $(\alpha + 120°)$ in Figs. 10 and 11 respectively and similarly for the fluxes derived from $E_2$, $I_2$ and $E_3$, $I_3$, and if furthermore the two electro-magnet systems $E_1$ $E_2$, $E'_1$ $E'_2$ are made to act on the same movable element $m$, as shown in Fig. 15, and if their torques are adjusted so as to obtain a zero resultant torque when the voltages or currents are balanced then, when the voltages and currents are unbalanced there will be a torque:

$$C = k(P\alpha_i + P\alpha_o)$$

where $P\alpha_i$ and $P\alpha_o$ are respectively the negative and zero phase sequence components of the power.

If instead of connecting the point O of Fig. 10 to the point N, an artificial or isolated neutral point is made, $P\alpha_o$ vanishes and the torque of the apparatus assumes the form $C = kP\alpha_i$.

The three wattmetric elements may be replaced by two if the relations between the currents are taken into account as will be obvious from the description in connection with Figs. 4 to 9 inclusive.

Instead however of eliminating one or two of the phase sequence components of the power, it may be of interest only to reduce the value of one of such phase sequence components with respect to the others. Thus, if for example the movable element is subjected to a torque of form $$C_1 = k(P_d + P_i + P_o)$$

and to another of form $$C_2 = k'(P_d - P_i)$$

where $P_d$, $P_i$ and $P_o$ have the same meaning as heretofore, and $k$, $k'$ are two positive constants depending for example on the design characteristics of the apparatus, a resultant torque may be obtained of the form:

$$C = C_1 - C_2 = (k-k')P_d + (k+k')P_i + kP_o$$

and, if the voltages or currents have a zero resultant that is to say, zero phase power does not affect the device as in Figs. 3 and 4 for example then:

$$C = (k-k')P_d + (k+k')P_i$$

When $k = k'$, the expression narrows down to Formula (7') given above and the component $P_d$ vanishes. But if $k \neq k'$, the value of the component $P_d$ is merely diminished with respect to that of the component $P_i$. In this way, for example, the devices may be highly sensitive to negative phase sequence power which accompanies phase unbalance and yet sufficiently sensitive to positive phase sequence power to insure operation on large balanced currents, such as may occur in case of a three-phase short-circuit. Also, if $(k-k')$ is relatively small, then the effect of balanced loads on the device is diminished so that under abnormal conditions the devices become more discriminating than the known types of power responsive devices.

This method of reducing the value of one component with respect to the others may be made use of in connection with all the examples discussed above, as it is merely a question of design constants.

The utilization of the phase and line voltages obtaining in the circuit and of the phase or line currents has been considered in the proceeding. It is also possible to use voltages of the form $U'' = (aU + bU')$ where U and U' are vectors designating two of the circuit voltages, $a$ and $b$ being positive or negative constants. Voltages of the form $U''$ may be obtained by means of transformers or auto-transformers, fed by the voltages of the system, or by means of transformers or auto-transformers of the rotating field type. Thus, for example as shown in Fig. 16 which is a modification of my invention similar to Fig. 6, a voltage $E_{2.1}$ directly proportional to the voltage on the coil $A_1B_1$ of Fig. 6 can be obtained where suitable means such as a star-delta potential transformer 21 forms a part of the available equipment by connecting the coil $A_1B_1$ so that it is energized in accordance with the sum of the voltages $E_1$ and $\frac{1}{2}E_3$, since this sum is $\frac{1}{2}E_{2.1}$. Similarly the coil $A_2B_2$ is connected to be energized in accordance with the sum of the voltages $E_2$ and $\frac{1}{2}E_1$ this sum being $\frac{1}{2}E_{2.3}$.

Similarly currents or ampere-turns may be used of the form $(aI+bI')$ where I and I' are vectors of two of the line or phase currents, $a$ and $b$ being positive or negative constants.

Ampere-turns or currents of the above form may be obtained in several ways. For instance a double winding may be used, one of the windings having the current I flowing through it, the other the current I', the two windings having the same or an unequal number of turns which may be wound in the same or in opposite directions. For example, as shown in Fig. 16 it may be necessary to obtain the currents, $I_1$ and $I_3$ of the circuit 1, 2, 3, desired in the current coils of the upper and lower elements of the device from a line 1', 2', 3' fed through a star-delta power transformer 22. This can be done by current transformers 23, 24 and 25 so connected to energize the two-part current coils 26, 27 and 28, 29, which may be arranged opposing as shown, that the resultant effect of coils 26, 27 is dependent on $I_{1'}-I_{2'}$ which equals $I_1$ and similarly the resultant effect of coils 28, 29 is proportional to $I_{3'}-I_{1'}$ which equals $I_3$. My invention is, of course, not limited to this arrangement but obviously includes the use of current transformers or auto-transformers having equal or unequal transformation ratios for the two currents I and I', and the sum or difference of the secondary currents may be fed to the winding of each electro-magnet and also the use of transformers with two primaries having equal or unequal coil turns fed by the currents I and I' may likewise be utilized.

I claim:

1. In an electroresponsive device for an electric circuit, a movable member and means for controlling the movement thereof in accordance with a resultant of a plurality of different predetermined functions of at least two of the phase sequence components of the power of said circuit.

2. In an electroresponsive device for an electric circuit, a movable member and means for controlling the movement thereof in accordance with the difference between two different predetermined functions of a plurality of the phase sequence components of the power of said circuit.

3. In an electroresponsive device for an electric circuit, a movable member, means for exerting thereon an effect dependent on the sum of at least two of the phase sequence components of the power of the circuit and means for exerting on said member an opposing effect dependent on the difference between the positive and negative phase sequence components of the power of the circuit.

4. In a electroresponsive device for an electric circuit, a movable member, means for controlling said member in accordance with the total power of the circuit and opposing means for controlling said member in accordance with the difference between the positive and negative phase sequence components of the power of the circuit.

5. In an electroresponsive device for an electric circuit, a rotatable member, and means for exerting thereon a torque substantially proportional to $(P_d+P_i+P_o)$ and an opposing torque substantially proportional to $(P_d-P_i)$ where $P_d$, $P_i$, and $P_o$ are respectively the positive, negative and zero phase sequence components of the power of the circuit.

6. In combination, means for exerting an effect dependent on a predetermined function of a plurality of the phase sequence components of the power of an electric circuit, co-operating means for exerting an effect dependent on a different predetermined function of a plurality of the phase sequence components of the power of the circuit and means controlled by the conjoint action of said exerting means.

7. In combination, means for exerting an effect dependent on a function of the sum of at least two of the phase sequence components of the power of an electric circuit, co-operating means for exerting an opposing effect dependent on a function of the difference between the positive and negative phase sequence components of the power of the circuit and means controlled by the conjoint action of said exerting means in accordance with the difference between the effects exerted thereby.

8. An electroresponsive device including rotatably mounted induction disk means and electro-magnetic means for exerting thereon a torque dependent on the difference between two different predetermined functions of a plurality of the phase sequence components of the power of an electric circuit.

9. In combination, means for exerting an effect dependent on the function of the sum of at least two of the phase sequence components of the power of an electric circuit, cooperating means for exerting an effect dependent on a function of the difference between two of the phase sequence components of the power of the circuit and means controlled by the conjoint action of said exerting means in accordance with a resultant of the effects exerted thereby.

10. In combination, a movable member and means for actuating the member in accordance with at least one of the phase sequence components of the power of an electric circuit, including electro-magnetic means for controlling said member in accordance with the total power of the circuit and cooperating electro-magnetic means for controlling said member in accordance with the difference between the positive and negative phase sequence components of the power of the circuit.

11. In combination, a movable member and means for actuating said member in accordance with the sum of the negative and zero phase sequence components of the power of an electric circuit including means for controlling said member in accordance with the sum of the positive, negative and zero phase sequence components of the circuit and cooperating opposing means for controlling the member in accordance with the difference between the positive and negative phase sequence components of the power of the circuit.

12. An electroresponsive device including rotatably mounted induction disk means and electro-magnetic means inductively associated with said disk means and arranged to exert thereon a torque proportional to the difference between two different predetermined functions of a plurality of the phase sequence components of the power of an electric circuit.

13. In combination with an electric circuit, an electroresponsive device including rotatably mounted induction disk means, electro-magnetic means inductively associated with said disk means and connected and arranged to exert thereon a torque proportional to the sum of at least two of the phase sequence components of the power of the circuit and cooperating electro-magnetic means inductively associated with said disk means and connected and arranged to exert thereon an opposing torque proportional to the difference between two of the phase sequence components of the power of the circuit.

14. In combination with an electric circuit, an electroresponsive device including rotatably mounted induction disk means and means for controlling the rotation of said disk means in accordance with at least one of the phase sequence components of the power of the circuit including electro-magnetic motor means inductively associated with the disk means and connected and arranged to exert thereon a torque proportional to the total power of the circuit and cooperating electro-magnetic means inductively associated with said disk means and connected and arranged to exert thereon an opposing torque proportional to the difference between the positive and negative phase sequence components of the power of the circuit.

15. In an electroresponsive device for a three-phase electric circuit, rotatably mounted member, means for exerting thereon three torques respectively proportional to the products of the currents in the three circuit conductors, the voltages to ground of the respective conductors and the cosines of the phase angles between the respective currents and voltages, and opposing means for exerting on said member three torques respectively proportional to the products of the currents in the three circuit conductors, the line to line voltages in quadrature to said currents under balanced circuit conditions and the sines of the phase angles between the respective currents and voltages.

16. The method of utilizing the phase sequence components of the power of a polyphase circuit which includes producing two forces respectively dependent on two different predetermined functions of a plurality of the phase sequence components of the power of the circuit and combining said forces to diminish the effect of one of said phase sequence components.

17. The method of utilizing the phase sequence components of the power of a polyphase circuit which includes producing two forces respectively dependent on two different predetermined functions of a plurality of the phase sequence components of the power of the circuit and combining said forces to diminish the effect of one of said phase sequence components relatively to another by a definite ratio.

18. The method of utilizing the phase sequence components of the power of a polyphase circuit which includes producing two forces respectively dependent on a function of the sum of the phase sequence components of the power of the circuit and a function of the difference between two of the phase sequence components of the power of the circuit and combining said forces to diminish the effect of one of said phase sequence components relatively to another by a definite ratio.

19. The method of utilizing the phase sequence components of the power of a polyphase circuit which includes producing two forces respectively equal to $k_1 (P_d + P_i + P_o)$ and $k_2 (P_d - P_i)$ where $k_1$ and $k_2$ are constants and $P_d$, $P_i$ and $P_o$ are respectively the positive, negative and zero phase sequence components of the power of the circuit and combining said forces to diminish the effect of one of said phase sequence components in accordance with the relative values of $k_1$ and $k_2$.

20. In combination, a movable member, means for exerting thereon a force dependent on a predetermined function of a plurality of the phase sequence components of the power of a polyphase circuit and cooperating means for changing the action of said force on said member arranged to reduce the effect of one of said phase sequence components, said cooperating means being arranged to exert on said member a force dependent on a different predetermined function of a plurality of the phase sequence components of the power of the circuit.

AVRAM DAVID ILIOVICI.

Certificate of Correction

Patent No. 1,816,778. Granted July 28, 1931, to

AVRAM DAVID ILIOVICI.

It is hereby certified that error appears in the printed specification of the above numbered patent requiring correction as follows: Page 2, lines 106 to 109, should read $$(9) \quad P' = (E_{3_d} - E_{2_d}) I_{1_d} \sin \phi'_{1_d} + (E_{1_d} - E_{3_d}) I_{2_d} \sin \phi'_{2_d} + (E_{2_d} - E_{1_d}) I_{3_d} \sin \phi'_{3_d} + (E_{3_i} - E_{2_i}) I_{1_i} \sin \phi'_{1_i}$$

instead of as shown; and that the said Letters Patent should be read with this correction therein that the same may conform to the record of the case in the Patent Office.

Signed and sealed this 15th day of September, A. D. 1931.

[SEAL.] M. J. MOORE,
*Acting Commissioner of Patents.*